United States Patent [19]

Coffin et al.

[11] 3,969,289

[45] July 13, 1976

[54] ONE-PART FOAMABLE LATEX COMPOSITION

[75] Inventors: Perley A. Coffin, Gloucester; Philip G. Cook, Newton; Paul D. Demerjian, Andover, all of Mass.

[73] Assignee: General Latex and Chemical Corporation, Cambridge, Mass.

[22] Filed: Mar. 15, 1971

[21] Appl. No.: 124,514

[52] U.S. Cl. .................... 260/2.5 L; 260/2.5 H; 260/2.5 HB; 260/5; 260/29.7 NQ; 260/29.7 M; 260/29.7 SE; 260/29.7 SQ; 260/723; 260/815; 260/827; 428/310; 428/320; 260/23.7 A; 260/23.7 M

[51] Int. Cl.² .................... C08J 9/30; C08K 5/16; C08L 7/02; C08L 9/08

[58] Field of Search .............. 260/2.5 L, 29.7 NQ, 260/29.7 M, 29.7 SE, 29.7 SQ, 723, 815, 5

[56] References Cited
UNITED STATES PATENTS 2,519,887  8/1950  Chassaing ...................... 260/815
3,255,140  6/1966  Sinn et al. ...................... 260/2.5 L

FOREIGN PATENTS OR APPLICATIONS 862,114  3/1961  United Kingdom ............. 260/2.5 L

*Primary Examiner*—Wilbert J. Briggs, Sr.
*Attorney, Agent, or Firm*—Richard P. Crowley

[57] ABSTRACT

A single-component foamable latex composition, the method of preparing the composition, and the foams prepared therefrom, which composition comprises a natural or synthetic latex or blends, ammonia, a curing system, a siloxane heat-sensitizing agent, and a zinc dibenzyl dithio carbamate accelerator. The latex composition is capable of being stored for a long period of time without gellation or precure prior to use. The combination of a heat-sensitizing agent and an ammonia-retardant accelerating agent has been found to prevent premature gellation and precure of the latex composition.

27 Claims, No Drawings

ONE-PART FOAMABLE LATEX COMPOSITION

BACKGROUND OF THE INVENTION

Both natural and synthetic elastomeric latex compositions and blends thereof have been employed in the preparation of foam products, such as foam backings for tufted carpets. Typically, the preparation of a latex foam has required a multicomponent latex composition wherein a latex user has been required to mix the component parts of the latex composition just prior to use. The latex composition so mixed is then foamed by mechanically whipping in air with, for example, an Oakes foamer, and then depositing the latex froth on a surface, such as a back of a carpet, a belt or a mold, and heating to effect the desired gel embossing and cure of the foam. Some disadvantages of such conventional latex foam manufacture have been the necessity of shipping a multiple-part mixture to the customer and requiring the customer to mix the component parts just prior to use, as well as to employ a foamer device containing proportioning pumps.

The division of a foamable latex into its component parts for shipment to a customer may involve two, three, four or even more different component compositions. A supplier might furnish a latex customer a multicomponent foam packaging comprising four separate components. A first component would comprise a natural or synthetic gellable, vulcanizable elastomeric latex, such as natural rubber or a styrene-butadiene rubber, with a foaming agent, such as surfactants or frequently potassium soaps. A second component would comprise various vulcanizing or curing agents (and cross-linking ingredients where required), together with an accelerator or combinations of accelerators known as a curing system. Some accelerators would include metal alkyl xanthates, salts of N-substituted dithio carbamic acid, thiazoles, thiurams, and other compounds. Commonly used as accelerators are the zinc salts of dialkyl dithio carbamates. Optionally, antioxidants and stabilizers may be added, and where necessary, a cross-linking agent used, for example, in carboxylated latices, a melamine or urea-formaldehyde resin or isocyanate compound, or peroxides used. The materials of the second component, if included in the first component, would result in a precure or premature gellation of the mixed components so that when the foam is prepared, it is friable when deposited or would not be capable of being embossed. In addition, the mixture of the first and second components would not permit long-term storage without and undesirable gellation or precure, or both. Gellation refers to the change of a latex system from a liquid to a solid, while precure refers to the premature change in the elastomeric and chemical structure and properties of the polymer. Both gellation and precure may effect the storage life and ultimate use of a latex composition.

The third component is typically a gelling or coagulating agent which lowers the pH of the latex composition and destabilizes the latex to obtain coagulation after foaming through a chemical reaction. Gelling agents employed would include a fluoride, such as sodium silicofluoride, or a hydrolizable salt such as an ammonium salt such as ammonium acetate. An optional fourth component would include fillers and pigments which may be supplied by the manufacturer in dispersion form for ultimate mixing by the customer or in dry form for dispersion and mixing by the customer.

Such multicomponent systems have many disadvantages associated with their preparation, shipment, and ultimate use. It is desirable, therefore, to provide a latex composition and method which would overcome such disadvantages, and particularly, to provide a foamable latex composition which could be shipped and stored for extended periods of time without precure or gellation.

U.S. Pat. No. 3,491,033 describes a two-part latex composition for foaming wherein the latex is specially compounded so as to be free of agents capable of gelling the wet foam. Such no-gell foam compositions have the disadvantage of generally requiring a single pass oven for their use as they depend on water removal to gell.

SUMMARY OF THE INVENTION

Our invention concerns a unique latex composition wherein curing agents and accelerators may be employed directly together in a one-component mixture with the gellable polymeric latex and the composition stored for extended periods of time without adverse precure or gellation effects. Our invention also concerns the method of preparing such latex composition, the use of such latex composition and the products prepared therefrom. In particular, our single-component latex composition is particularly suitable for use as a one-part gellable foamable latex composition which may be shipped to and stored by customers prior to use without substantial diminution in the quality of the latex or foam product produced therefrom. More particularly, our invention eliminates the requirement of the past practice in the art of maintaining the curing system separate from the polymeric latex until just prior to use. Our invention is particularly advantageous in the preparation of a foamable latex composition, but also may be used directly in the production of cured natural and synthetic elastomers, in dipping, extruding and molding, as in slush-molding operations.

We have found, quite unexpectedly, that a unique, storable latex composition which contains a gellable curable natural or synthetic elastomer, together with curing ingredients and accelerators, is obtained by employing in the latex a heat-sensitizing agent in combination with an ammonia-retarded accelerator. We have discovered a one-component latex composition which includes, in admixture, a natural or synthetic elastomeric curable polymer in latex form, a curing system for such elastomer, ammonia, a heat-sensitive amount of a polysiloxane heat-sensitizing compound and an accelerator which, in the presence of ammonia, does not function to accelerate the cure of the latex. Such latex composition, after storage, may be used or foamed in the conventional manner and produce curable and gellable foams.

Our one-component latex composition comprises:
a. a curable or cross-linkable, natural or synthetic elastomeric latex, particularly those unsaturated such as conjugated diene elastomers as natural rubber or styrene-diene, such as styrene-butadiene copolymers, as well as carboxylated styrene-butadiene and similar unsaturated curable elastomers and polymers subject to curing;
b. a curing system, such as curing agents like sulfur and activators like zinc oxide, and where required, crosslinking agents and similar materials in conventional amounts;

c. a volatile base such as ammonia, either naturally present, as in natural latex, or added;

d. a heat-sensitizing agent in an amount sufficient to lower the coagulation point of the latex, for example, to a temperature of 90°F; e.g., a range of 100° to 180°F. Preferred agents include the polysiloxane compounds such as siloxane-oxalkylene copolymer compounds, such as $[CH_3SiO_3][(CH_3)_2SiO]_{20}([C_2H_4O]_{4.3}-[C_3H_6O]_3C_4H_9)_3$;
$[CH_3SiO_3][(CH_3)_2SiO]_{20}((CH_3)_2Si-CH_1--O[C_2H_4O]_{4.3}-$ $[C_3H_6O]_3C_4H_9)_3$;
$[CH_3SiO_3][(CH_3)_2SiO]_{15}((CH_3)_2Si--Ch_2--S--[C_2H_4O]_3 [C_3H_6O]_2OH)_3$; or other methyl or phenyl, ethoxy or propoxy-siloxane block copolymers; and e. an accelerator which is inhibited from accelerating the curing system in the presence of ammonia, such as zinc dibenzyl dithio carbamate, which is the accelerator particularly preferred.

We have found that latex compositions containing the conventional zinc dialkyl dithio carbamate as accelerators in the curing system, such as the zinc dimethyl, diethyl and dibutyl dithio carbamates, do not permit the advantages of our invention. Such accelerators when used in a latex containing an oxyalkylene siloxane heat-sensitizing agent provide latex compositions which exhibit gellation and precuring tendencies and may not be stored for extended periods of time. Our composition permits gellation on heating the latex composition and curing on driving off the ammonia. The heat-sensitizing agents and the ultra accelerator, such as zinc dibenzyl dithio carbamate accelerator, are employed in the presence of an ammonia base in the latex which is naturally present in natural rubber latex or which may be added to the natural rubber or other elastomers. Our latex compositions may be cured through the removing of the ammonia, for example, even at room temperature; e.g., 70–90°F. More typically, our latex compositions are cured in production by heating; e.g., over 250°F, to drive off the ammonia, thereby permitting the accelerator to function and the curing mechanism to proceed.

A variety of heat-sensitizing agents may be employed in our latex composition; however, it is preferred that functional siloxane compounds be employed, since we have found that latex compositions made with siloxanes in general do not change in gellation temperature with storage, while mechanical stability remains relatively constant as compared to other known heat-sensitizing agents. Our preferred siloxanes include those soloxanes identified as heat-sensitizing agents for latex mixtures in U.S. Pat. Nos. 3,255,140 and 3,484,394, hereby incorporated by reference in their entirety.

The natural and synthetic latices and blends thereof described in the above U.S. patent art may be employed in our invention as well as other sulfur-cured natural and synthetic diene and conjugated diene vulcanizable elastomers and those materials and blends which contain pendant reactant groups, such as sulfonic or carboxylic acid groups, such as those present in carboxylated unsaturated curable synthetic latices, such as carboxylated diene rubber like styrene-butadiene copolymers.

Any accelerator or combination thereof which is inhibited in its acceleration function by the presence of ammonia may be employed in combination with the heat-sensitizing agents in order to provide the one-component latex compositions of our invention. We have found that zinc dibenzyl dithio carbamate is a preferred ammonia-inhibited ultra accelerator which may be employed in combination with the siloxane-oxyalkylene compounds in latex compositions. The polyvalent heavy metal salt dibenzyl dithio carbamate may be used with other accelerators, such as in synergistic combinations where the other accelerators are not active to induce precure in the latex. The corresponding zinc alkyl N- substituted dithio carbamate acid salts cannot be suitably employed, since such salts are not inhibited in the presence of ammonia, but tend to function as accelerators at room temperatures. The heat-sensitizing agents may be employed in an amount from about 1 to 15 parts per hundred of the elastomer; e.g., 5 to 10 parts, in combination with from about 0.25 to 5.0 parts per hundred parts of the elastomer; e.g., 1.0 to 3.0, of the ammonia-inhibited accelerators. Sufficient ammonia is employed to prevent and retard the acceleration, typical amounts ranging from about 0.2 to 3.0; e.g., 0.3 to 2.0, parts per hundred (theoretical dry weight) of the elastomer.

In addition to the ingredients specified in our one-component latex composition, it is recognized that other and conventional ingredients and additives may be employed, either separately or in combination; for example, fillers, pigments, stabilizers, antioxidants, other curing agents, fire retardants, dyes, oils, plasticizers, surfactants, foaming agents, high temperature accelerators (e.g., over 200°F), and similar materials may be incorporated in latex compositions as desired.

Our latex compositions are particularly adapted to be foamed, gelled, dried (optionally embossed) and cured, and to provide a latex foam, such as for a carpet backing or for other uses. The latex composition may be foamed as received or after storage by mechanically incorporating therein air or other gas. The foam or froth layer is heated to a temperature sufficient to cause gellation, the gelled foam embossed, if desired, by embossing rolls, and the foam subsequently dried and cured by heating at an elevated temperature; e.g., 200° to 400°F. Our latex compositions may also be usefully employed with or without foaming; for example, in a dipping operation, such as for making thin wall articles by immersion techniques, and more particularly, due to its one-component nature, our latex compositions may be usefully employed in molding operations, such as in the slush molding manufacture of articles, such as footwear like boots and rubbers. For example, a small amount of our latex composition may be incorporated into a rotating slush mold deposited on the wall surface, or introduced into a heated mold and then the excess amount drained off, or be directly introduced in the desired amount into a mold. The mold spoken of may contain embossed or engraved features on the walls thereof, so the resulting product will contain such impression.

The advantages of our latex composition over the prior art are many and include the advantage that the latex may be shipped and stored in bulk. Either a Hobart whip or just a foam blender is required; that is, separate proportioning of the ingredients while preparing the foam is not required, such as in an Oakes foamer. In addition, rather than a single pass oven, a two, three or multiple pass oven or drying techniques can be used to gell, dry and cure the latex foam; for example, a three-stage oven to accomplish gellation, drying and curing steps. The heating may take place by the use of a hot air oven, steam chambers or radiant heat sources, such as infrared heat, or any combination thereof. Further advantages of our latex compositions would include that such compositions may be used in bulk and in small quantities with the disadvantages of separately mixing the components obviated.

EMBODIMENTS OF THE INVENTION

Our invention is illustrated by, but not limited to, the following latex compositions and examples:

EXAMPLE 1.

A one-part foamable latex composition comprising a blend of natural rubber and styrene-butadiene latex in accordance with our invention was prepared employing the following formulation:

| Materials | Wet Parts |
|---|---|
| 1. Polysar[1] Latex 727 (69% solids) | 102.00 |
| 2. 20% Rosinate soap stabilizer | 10.00 |
| 3. 20% Talloil soap frothing agent | 10.00 |
| 4. 20% Potassium oleate soap - frothing agent | 5.00 |
| 5. Natural Latex (62% solids) | 48.50 |
| 6. Ammonia 26'Baume | 2.00 |
| 7. Water | 10.00 |
| 8. Dispersing agent - trisodium polyphosphate | 0.50 |
| 9. Clay filler | 110.00 |
| 10. 50% Silicone emulsion - bonding agent | 0.50 |
| 11. 50% Zinc oxide dispersion activator | 10.00 |
| 12. 40% Accelerator dispersion (zinc salt of mercapto benzylthiazole) | 5.00 |
| 13. 35% Acivator dispersion (zinc dibenzyl dithiocarbamate) | 5.75 |
| 14. 50% Antioxidant dispersion | 3.00 |
| 15. 66.7% Sulfur dispersion curing agent | 3.00 |
| 16. Trimene[2] base - accelerator | 1.00 |
| 17. Coagulant WS[3] heat-sensitizing agent functional polysiloxane | 8.00 |
| 18. Polyacrylate thickener | 1.00 |

[1]Polysar is a trademark of Polymer Corporation for a styrene-butadiene elastomer (for example, 60% to 70% butadiene, 30% to 40% styrene).
[2]Trimene base is a trademark of Uniroyal Corporation for a liquid reaction product of ethyl chloride, formaldehyde and ammonia used as a rubber accelerator and sensitizer (U.S. patent 2,776,330).
[3]Coagulant WS is a trademark of Naftone, Inc. for a siloxane latex heat-sensitizing agent.

A one-part foamable latex composition was prepared by adding the Items 2–7 to Item 1 in order with agitation, followed by the addition of all or part of the Item 18 under agitation to obtain the desired viscosity. A desirable viscosity for our formulation would be from about 2,000 to 3,000 cps; e.g., 2500, as measured by a Brookfield viscometer RVF employing No. 5 spindle four rpm.

EXAMPLE 2.

The formulation as set forth in Example 1 was prepared in the same manner, except that the ultra accelerator, zinc dibenzyl dithiocarbamate, was replaced by zinc dibutyl dithiocarbamate.

EXAMPLE 3.

Immediately after the preparation of the formulation set forth in Examples 1 and 2, the formulations were frothed by whipping in air employing a laboratory mixer to obtain a density of approximately 17 lbs. per cubic foot (dry basis), which constitutes a medium density foam. Foam density may be frothed from, e.g., to 25 lbs. per cubic foot. The frothed latex composition was then spread out on a substrate, such as a cardboard, to a thickness of approximately three-sixteenths of an inch, and the frothed foam then cured in an oven at a temperature of about 300° for ten minutes. After curing, the cured latex foam was examined for physical characteristics and tested for foam structure and strength. Each of the frothed latex foams so prepared were satisfactory.

The foam latex compositions were then stored and three days later, each were again frothed in the same manner as above, cured and examined. The formulation of Example 2 on examination had a very weak strength foam structure which would be unacceptable for commercial use, which foam structure could be easily scuffed and broken, indicating that precure had occurred during the three-day storage period. The formulation of Example 1 as representative of our invention showed no precure tendencies in the cured frothed foam and no change in characteristics from the cured foam as originally examined. The formulation shown in Example 1, after four months storage, was again frothed, cured and examined, and even after this extended storage period as a one-part foamable latex composition, the cured foam did not show any indications by lack of strength or other characteristics of either precure nor gellation characteristics.

Our one-part foamable latex composition has been described in particular employing a zinc dibenzyl dithiocarbamate as a respresentative example of the types of a volatile nitrogen base-inhibited ultra accelerator which may be employed. It is recognized that other ultra accelerators representative of other heavy metal salts and other organic constituents may be employed in the practice of our invention. Further, our examples have employed, as the base, ammonia as the preferred operating embodiment due to cost, volatility and performance. However, it is recognized that other bases may be employed, which bases can be evaporated during the curing cycle, permitting curing to occur. Such volatile bases would include organic nitrogen-containing bases, for example, aliphatic, alicyclic and aryl amines, such as lower alkyl and alkylene amines. Representative examples include ethyl amine, quaternary ammonium hydroxide, morpholine, diethyl amine, isobutyl amine, etc..

EXAMPLE 4.

Similar one-part foamable formulations have been prepared as in Example 1, employing only a styrene-butadiene latex or only a natural rubber latex, which formulations performed in a similar manner as the formulation of Example 1. In addition, formulations in which there have been substitutes of zinc diethyl dithiocarbamate for the zinc dibenzyl dithiocarbamate have also shown precuring tendencies in storage as the formulation in Example 2.

In commercial practice, our one-part foamable latex composition, such as in Example 1, may be stored by a customer for extended periods of time, and then mechanically frothed with a mixer to a desired foam density; e.g., 6 – 10 lbs per cubic foot, without any premixing of other components as in the prior art. The foam may be placed on the back of a tufted rug to a desired depth; e.g., one-sixteenth to three-sixteenths of an inch, and then heated to cure the latex, thereby providing a cellular-backed tufted rug.

Having thus described our invention, what we claim is:

1. A one-part foamable latex composition which may be stored for extended periods of time prior to foaming, which foamable latex composition comprises:
   a. a natural or synthetic elastomeric latex subject to cure;

b. a curing system which comprises an ammonia-retardant dibenzyl dithiocarbamate accelerating agent, which agent is inhibited in accelerating function in the presence of the base;
c. a volatile nitrogen-containing base in an amount sufficient to inhibit the cure of the latex;
d. a siloxane heat-sensitizing agent to lower the coagulation temperature of the latex to about 90°F or above; and
e. a foaming agent in an amount to permit mechanical frothing of the composition into a foam.

2. The latex composition of claim 1 wherein the latex is a synthetic diene elastomeric polymer.

3. The latex composition of claim 1 wherein the polymeric latex is a natural rubber, a styrene-butadiene elastomer, or blends thereof.

4. The latex composition of claim 1 wherein the heat-sensitizing agent is an oxyalkylene-siloxane compound.

5. The latex composition of claim 1 wherein the heat-sensitizing agent is an ethoxy or propoxy-siloxane copolymer.

6. The latex composition of claim 1 wherein the accelerator is zinc dibenzyl dithio carbamate.

7. The latex composition of claim 1 wherein the heat-sensitizing agent is present in an amount of from about 1 to 15 parts per hundred parts of the elastomer.

8. The latex composition of claim 1 wherein the accelerator is present in an amount of from about 0.25 to 5.0 parts per hundred parts of the elastomer.

9. The latex composition of claim 1 wherein the base is present in an amount of from about 0.2 to 3.0 parts (dry weight theoretical basis) per hundred parts of the elastomer.

10. The latex composition of claim 1 wherein the heat-sensitizing agent lowers the coagulation temperature to a range of from 100°F to 180°F.

11. The latex composition of claim 1 wherein the foaming agent is a potassium soap, and the composition contains a clay filler material.

12. A one-part foamable latex composition which may be stored for extended periods of time, which comprises in admixture;
a. a natural or synthetic diene conjugated elastomeric latex or blends thereof;
b. a curing system which comprises zinc dibenzyl dithio carbamate accelerator in an amount of from about 0.25 to 5.0 parts per hundred parts of the elastomer;
c. an oxyalkylene-siloxane copolymeric heat-sensitizing agent in an amount of from about 1 to 15 parts per hundred parts of the elastomer;
d. ammonia in an amount of from about 0.2 to 3.0 parts (dry weight theoretical basis) per hundred parts of the elastomer; and
e. a foaming agent in an amount to permit mechanical frothing of the composition into a foam.

13. The latex composition of claim 12 wherein the elastomer is a styrene-butadiene elastomeric copolymer.

14. In a process for producing a latex composition, which latex composition comprises:
a. a natural or synthetic elastomeric latex subject to cure;
b. a curing system; and
c. a base in an amount sufficient to inhibit the cure of the latex, the improvement which comprises:
i. incorporating into the latex composition a siloxane heat-sensitizing agent to lower the coagulation temperature of the latex to about 90°F or above;
ii. incorporating a dibenzyl dithiocarbamate accelerating agent into the latex, which agent is inhibited in an accelerating function in the presence of the base; and
iii. incorporating into the latex a foaming agent to permit mechanical frothing of the latex into a foam, thereby providing a one-part foamable latex composition which may be stored for extended periods of time prior to foaming and use.

15. The process of claim 14 wherein the latex is a synthetic diene elastomeric polymer.

16. The process of claim 14 wherein the polymeric latex is a natural rubber, a styrene-butadiene elastomer, and blends thereof.

17. The process of claim 14 wherein the heat-sensitizing agent is a polysilixane compound.

18. The process of claim 14 wherein the heat-sensitizing agent is an oxyalkylene-siloxane copolymer.

19. The process of claim 14 wherein the accelerator is zinc dibenzyl dithio carbamate.

20. The process of claim 14 wherein the heat-sensitizing agent is present in an amount of from about 1 to 15 parts per hundred parts of the elastomer.

21. The process of claim 14 wherein the accelerator is present in an amount of from about 0.25 to 5.0 parts per hundred parts of the elastomer.

22. The process of claim 14 wherein the base is ammonia and is present in an amount of from about 0.2 to 3.0 parts (dry weight theoretical basis) per hundred parts of the elastomer.

23. The process of claim 14 wherein the heat-sensitizing agent lowers the coagulation temperature to a range of from 100°F to 180°F.

24. The dried cured foam produced by the process of claim 16.

25. The process of claim 15 which includes mechanically frothing the latex to form a foam and curing the frothed latex foam composition by heating the composition and evaporating the base therefrom.

26. The process of claim 25 which includes coating the frothed latex composition onto the back surface of a tufted carpet to form a foam layer prior to curing the foam.

27. In a process for producing a foamable latex composition, which latex composition comprises:
a. a natural or synthetic elastomeric latex subject to cure;
b. a curing system;
c. ammonia in an amount of from about 0.2 to 3.0 parts (dry weight theoretical basis) per hundred parts of the elastomer; and
d. a foaming agent; the improvement which comprises:
i. incorporating into the foamable latex composition from about 1 to 15 parts per hundred parts of elastomer of a siloxane heat-sensitizing agent to lower the coagulation temperature to a range of from about 100° to 180°F; and
ii. incorporating into the latex composition from about 0.25 to 5.0 parts per hundred parts of the elastomer of a zinc dibenzyl dithio carbamate accelerator, thereby providing a one-part latex composition with reduced precure and gellation tendencies during extended periods of storage.

* * * * *